United States Patent

Aoki et al.

(10) Patent No.: US 6,587,607 B2
(45) Date of Patent: Jul. 1, 2003

(54) OPTICAL FIBER CHROMATIC DISPERSION DISTRIBUTION MEASURING APPARATUS AND MEASURING METHOD

(75) Inventors: Shoichi Aoki, Tokyo (JP); Sinya Nagashima, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/997,510

(22) Filed: Nov. 29, 2001

(65) Prior Publication Data

US 2002/0064335 A1 May 30, 2002

(30) Foreign Application Priority Data

Nov. 29, 2000 (JP) ............................................. 2000-363807

(51) Int. Cl.[7] .............................. G02B 6/26; G02B 6/42
(52) U.S. Cl. .......................... 385/15; 385/7; 385/42; 356/73.1
(58) Field of Search .................................. 385/1, 2, 3, 7, 385/16, 42; 356/73.1; 359/341.1, 337.5

(56) References Cited

U.S. PATENT DOCUMENTS

| | | | | |
|---|---|---|---|---|
| 5,969,806 A | * | 10/1999 | Bergano | ..................... 356/73.1 |
| 6,011,615 A | * | 1/2000 | Mamyshev et al. | ........ 356/73.1 |
| 2002/0089736 A1 | * | 7/2002 | Aoki et al. | ................. 359/326 |

FOREIGN PATENT DOCUMENTS

JP          10-83006          3/1998

\* cited by examiner

Primary Examiner—Robert H. Kim
Assistant Examiner—Therese Barber
(74) Attorney, Agent, or Firm—Fish & Richardson PC

(57) ABSTRACT

An apparatus for measuring the chromatic dispersion profile of an optical fiber using two light sources 1 and 2 at least one of which is tunable in wavelength, in which two light beams of different wavelengths from said two light sources are injected into a optical fiber under test 7 and the four-wave mixing light that is generated by interaction between said light beams of different wavelengths is measured with an optical time domain reflectometer (OTDR) 9, characterized in that an optical bandpass filter 8 having a fixed central frequency is provided at a stage upstream of said optical time domain reflectometer (OTDR).

8 Claims, 1 Drawing Sheet

OPTICAL FIBER CHROMATIC DISPERSION DISTRIBUTION MEASURING APPARATUS AND MEASURING METHOD

BACKGROUND OF THE INVENTION

1. Field of the Invention

The present invention relates to an optical fiber chromatic dispersion distribution measuring apparatus for measuring the chromatic dispersion distribution of an optical fiber and a measuring method.

2. Description of the Related Art

It is known that when two pulse light beams having different wavelengths $\lambda_1$, $\lambda_2$ from each other are simultaneously inputted to an optical fiber under test, four-wave mixing light beams are generated due to interaction between the two inputted pulse light beams.

A relation among the wavelengths $\lambda_1$, $\lambda_2$ of the pulse light beams and wavelengths $\lambda_3$, $\lambda_4$ of the four-wave mixing light beams is shown in FIG. 2.

In FIG. 2, the longitudinal axis indicates the wavelength of each of light beams and the transverse axis indicates the intensity of each of light beams. Symbols a and b indicate the pulse light beams having the wavelength $\lambda_1$ and $\lambda_2$, respectively. Symbols c and d indicate the four-wave mixing light beams having wavelengths $\lambda_3$ and $\lambda_4$, respectively. The wavelengths $\lambda_1$, $\lambda_2$, $\lambda_3$, and $\lambda_4$ satisfy the following relation:

$\lambda_1 - \lambda_3 = \lambda_4 - \lambda_2 = \lambda_2 - \lambda_1 = \lambda_0$ ($\lambda_0$ is about 5 to 10 nm)

An interval between the wavelengths of the pulse light beams (that is, $\lambda_2 - \lambda_1 = \lambda_0$) is the smaller, the intensity of the four-wave mixing light beams are the larger.

An optical fiber chromatic dispersion distribution measuring apparatus according to a related art extracts either one of the four-wave mixing light beams having the wavelengths $\lambda_3$ and $\lambda_4$, that are reflected from the optical fiber under test, by an optical bandpass filter having a variable center wavelength to execute measurement of the chromatic dispersion distribution of the optical fiber under test.

However, due to a mechanical structure of the optical bandpass filter having the variable center wavelength, a loss caused by inserting the optical bandpass filter having the variable center wavelength is more than 10 dB to decrease the measurement sensitivity.

In case of compensating the loss, which is caused by inserting the optical bandpass filter having the variable center wavelength, by using an optical amplifier, the configuration of the apparatus becomes complicate.

SUMMARY OF THE INVENTION

An object of the invention is to provide an optical chromatic dispersion distribution measuring apparatus having a simple structure, enabling to change an interval of wavelengths of two inputted pulse light beams, and having high measurement sensitivity.

According to a first aspect of the invention, there is provided an optical fiber chromatic dispersion distribution measuring apparatus comprising:

two light sources for outputting light beams having different wavelengths from each other, respectively, to an optical fiber under test;

an optical time domain reflectometer for measuring four-wave mixing light beams generated by an interaction of the light beams inputted to the optical fiber under test; and an optical bandpass filter having a fixed center wavelength, wherein at least one of the two light source is a tunable light source;

the optical bandpass filter is disposed at a previous stage of the optical time domain reflectometer.

According to a second aspect of the invention, there is provided an optical fiber chromatic dispersion distribution measuring apparatus comprising:

two light sources for outputting CW light beams having different wavelengths from each other, respectively;

an optical coupler for combining a plurality of light beams;

a modulator;

an optical fiber amplifier;

a directional coupler;

an optical fiber under test;

an optical bandpass filter having a fixed center wavelength; and an optical time domain reflectometer;

wherein at least one of the two light source is a tunable light source;

the two light sources output the CW light beams to the optical coupler;

the optical coupler combines the CW light beams and outputs the combined CW light beams to the modulator;

the modulator modulates the CW light beams inputted from the optical coupler to generate pulse light beams having different wavelengths from each other and outputs the pulse light beams to the optical fiber amplifier;

the optical fiber amplifier amplifies the pulse light beams and outputs the amplified pulse light beams to the directional coupler;

the directional coupler outputs the pulse light beams inputted from the optical fiber amplifier to the optical fiber under test and outputs a light beam inputted from the optical fiber under test to the optical bandpass filter;

four-wave mixing light beams are generated in the optical fiber under test due to an interaction of the light beams inputted from the directional coupler and is outputted to the directional coupler;

the optical bandpass filter extracts a light beam within a specific band from the light beam inputted from the directional coupler and outputs the extracted light beam to the optical time domain refelectometer; and the optical time domain reflectometer measures the chromatic dispersion distribution of the extracted light beam.

According to a third aspect of the invention, there is provided the optical fiber chromatic dispersion distribution measuring apparatus according to the second aspect of the invention wherein the four-wave mixing light beams are a light beam generated in lower frequency side than the pulse light beams and a light beam generated in higher frequency side than the pulse light beams; and only one of the four-wave mixing light beams is within the specific band of the optical bandpass filter.

According to a fourth aspect of the invention, there is provided an optical fiber chromatic dispersion distribution measuring method comprising the steps of:

outputting two light beams having different wavelengths from each other, respectively, to an optical fiber under test;

generating two four-wave mixing light beams in the optical fiber under test;

measuring one of the two four-wave mixing light beams to obtain the chromatic dispersion distribution of the optical fiber under test. Thus, even if the wavelengths of the light beams from the two light sources are changed, the optical fiber dispersion can be measured without lowering the measurement sensitivity.

According to a fifth aspect of the invention, there is provided an optical fiber chromatic dispersion distribution measurement method comprising the steps of:

outputting two CW light beams having different wavelengths from each other;

combining the CW light beams;

modulating the CW light beams to generate two pulse light beams having the different wavelengths from each other;

amplifying the pulse light beams;

inputting the pulse light beams to an optical fiber under test to generate two four-wave mixing light beams;

extracting one of the four-wave mixing light beams; and measuring the one of the four-wave mixing light beams to obtain the chromatic dispersion distribution of the optical fiber under test.

According to a sixth aspect of the invention, there is provided the method according to the fifth aspect of the invention, further comprising the steps of adjusting both wavelengths of the two light beams so that wavelength of the one of the four-wave mixing light beams coincides with a center wavelength of an optical bandpass filter having a fixed center wavelength for executing the extracting step. Thus, the wavelength of the four-wave mixing light beam is matched to the center wavelength of the optical bandpass filter more freely.

According to a second aspect of the invention, there is provided the method according to the sixth aspect of the invention, wherein interval between the wavelengths of the two CW light beams is held in the adjusting step. Thus, adjustment can be done while holding the intensity of the four-wave mixing light beam constant.

According to an eighth aspect of the invention, there is provided the method according to the fifth aspect of the invention, wherein ratio of the intensity of the two CW light beams is approximately 2:1. Whereby the optical fiber wavelength dispersion can be measured without any measurable variations in frequency under observation.

DETAILED DESCRIPTION OF THE PREFERRED EMBODIMENTS

An optical fiber chromatic dispersion distribution measuring apparatus according to the invention will be given with reference to FIG. 1.

Figure 1:
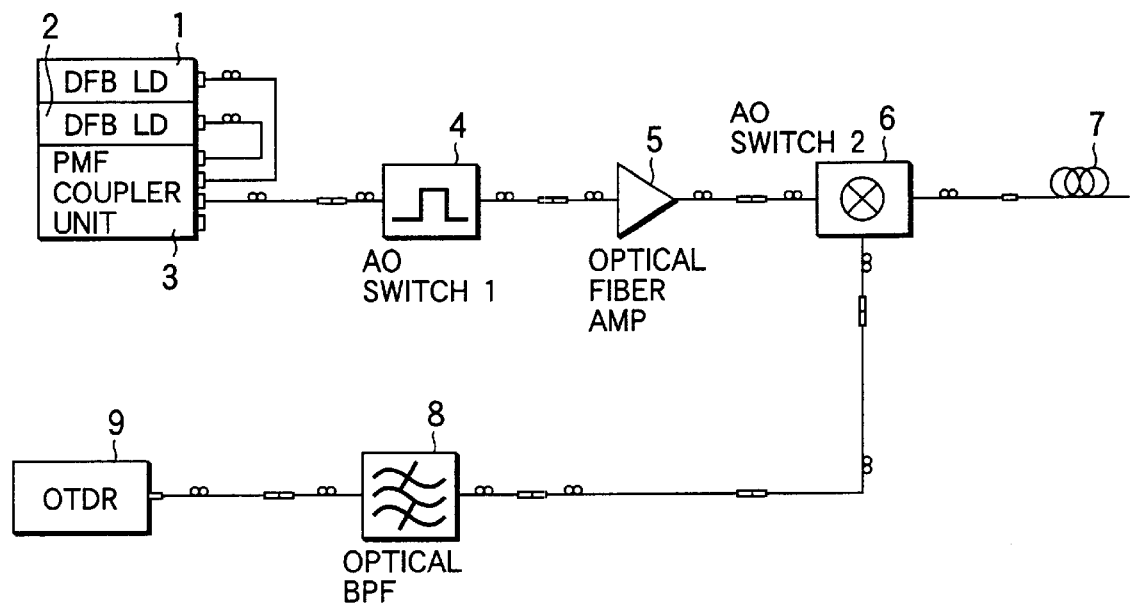
FIG. 1 is a drawing showing a configuration of an optical fiber chromatic dispersion distribution measuring apparatus according to the invention.

In FIG. 1, reference numeral 1 denotes a first light source (distributed feedback laser diode (DFB LD)), reference numeral 2 denotes a second light source (DFB LD), and reference numeral 3 denotes an optical coupler (Polarization Maintaining Fiber (PMF) Coupler Unit) for combining a plurality of light beams.

Reference numeral 4 denotes an acousto-optic element (first acousto-optic (AO) switch), reference numeral 5 denotes an optical fiber amplifier (Optical Fiber AMP), reference numeral 6 denotes a directional coupler (second acousto-optic (AO) switch, reference numeral 7 denotes a optical fiber under test, reference numeral 8 denotes an optical bandpass filter (Optical BPF), and reference numeral 9 denotes an optical time domain reflectometer (OTDR).

The light sources 1, 2 output continuous wave (CW) light beams having wavelengths $\lambda_1$, $\lambda_2$ to the optical coupler 3, respectively. The wavelengths $\lambda_1$ and $\lambda_2$ are different from each other. The optical coupler 3 combines the CW light beams to output the combined CW light beams to the acousto-optic element 4. The acousto-optic element 4 modulates the CW light beams to generate pulse light beams having wavelength $\lambda_1$, $\lambda_2$, respectively, and outputs the pulse light beams to the optical fiber amplifier 5. The optical fiber amplifier 5 amplify the pulse light beams and output the amplified pulse light beams to the directional coupler 6. The directional coupler 6 outputs the pulse light beams inputted from the optical fiber amplifier 5 to the optical fiber under test 7 and outputs a light beam inputted from the optical fiber under test 7 to the optical bandpass filter 8. The optical bandpass filter 8 extracts and outputs a light beam within a specific band to the optical time domain reflectometer 9. The optical time domain reflectometer 9 measures the extracted light beam from the optical bandpass filter 8 to execute measurement of the chromatic dispersion distribution of the optical fiber under test 7.

At least one of the light sources 1, 2 can change the wavelength of the light beam outputted therefrom (that is, at least one of the light sources 1, 2 is a variable light source).

When a pulse light beam having wavelength $\lambda_1$ and an optical pulse having wavelength $\lambda_2$ are inputted to the optical fiber under test 7, four-wave mixing light beams are generated in that fiber under test 7 by the interaction between backscattered light beams of the two pulse light beams.

Figure 2:
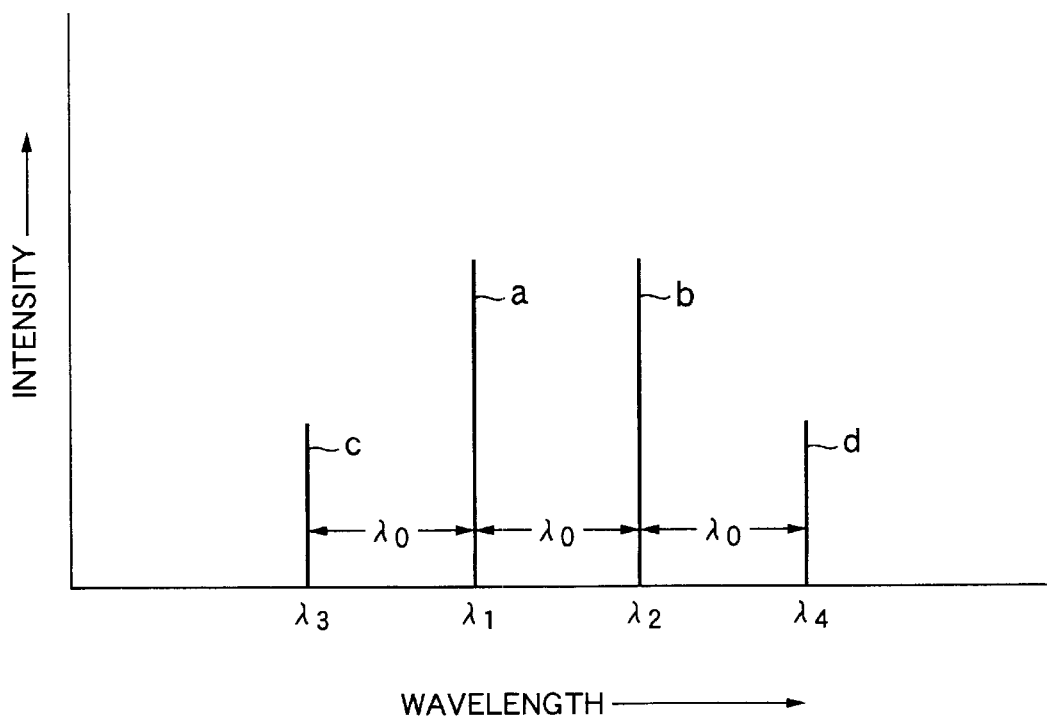
FIG. 2 is a drawing showing a relation in wavelength among a light beam having wavelength $\lambda_1$ from a light source 1, a light beam having wavelength $\lambda_2$ from a light source 2, and a four-wave mixing light beam.

In this case, a relation among the inputted light beams having wavelengths $\lambda_1$, $\lambda_2$ and the four-wave mixing light beams is the same as the related art and is shown in FIG. 2.

In FIG. 2, the horizontal axis of the graph indicates the wavelength of an pulse light beam and the vertical axis indicates the intensity of the pulse light beam. Symbols a and b indicate the inputted pulse light beams having the wavelength $\lambda_1$, $\lambda_2$ respectively and the wavelengths $\lambda_1$ and $\lambda_2$ satisfy the following relationship:

$$\lambda_2-\lambda_1=\lambda_0$$

(where $\lambda_0$ is about 5–10 nm)

Symbols c and d indicate the four-wave mixing light beams generated by the interaction between the two light beams having the wavelengths $\lambda_1$, $\lambda_2$, respectively. The four-wave mixing light beams have wavelengths $\lambda_3$ and $\lambda_4$, which satisfy the following relationship:

$$\lambda_1-\lambda_3=\lambda_4-\lambda_2=\lambda_2-\lambda_1=\lambda_0$$

Interval between the wavelengths of the inputted light beams ($\lambda_2-\lambda_1=\lambda_0$) is the smaller, the intensity of the four-wave mixing light beams (the light beams having the wavelength $\lambda_3$ and $\lambda_4$) is the larger.

One of the four-wave mixing light beams having the wavelengths $\lambda_3$ and $\lambda_4$ generated by the interaction between the backscattered light beams of the pulse light beams having the different wavelengths $\lambda_1$ and $\lambda_2$ is extracted by the optical bandpass filter 8 and measured with the optical time domain reflectometer (OTDR) to measure the chromatic dispersion distribution of the optical fiber under test 7.

At this time, in order to increase the measurement sensitivity in the optical time domain reflectometer (OTDR), it is necessary to accurately extract the four-wave mixing light beam ($\lambda_3$ or $\lambda_4$) by the optical bandpass filter 8.

To accurately extract the four-wave mixing light beam ($\lambda_3$), the extraction band of the optical bandpass filter may be comparatively broad so long as the interval between the four-wave mixing light beam ($\lambda_3$) and the adjacent light beam ($\lambda_1$) is large. However, this makes the interval between the light beams having $\lambda_3$ and $\lambda_1$ become large and the interval between $\lambda_1$ and $\lambda_2$ become large. As a result, the intensity of the four-wave mixing light ($\lambda_3$) becomes small.

This means a trade-off between broadening the extraction band and increasing the intensity of the extracted four-wave mixing light ($\lambda_3$ or $\lambda_4$).

Comparing to an optical bandpass filter having a fixed center wavelength, an optical bandpass filter having a variable center wavelength has a broader extraction band (it is difficult to obtain a filter having a narrow extraction band) and a greater loss.

Therefore, the present invention is characterized in that the optical bandpass filter 8 has a fixed center wavelength (viz. has a narrow extraction band and lower loss).

In the present invention, an optical bandpass filter having a fixed center wavelength is used as the optical bandpass filter 8. If the wavelengths $\lambda_1$ and $\lambda_2$ of the light beams emitted from the light sources 1 and 2 are fixed, one may choose a bandpass filter having a center wavelength fitting either one of the fixed wavelengths $\lambda_1$ and $\lambda_2$.

However, the wavelengths of the light beams from the light sources 1 and 2 may be changed. Therefore, in the present invention, at least one of the wavelengths $\lambda_1$ and $\lambda_2$ of the light beams from the two light sources 1 and 2 may be adjusted so that the four-wave mixing light ($\lambda_3$) coincides with the fixed center wavelength of the optical bandpass filter 8.

Also, the ratio of the intensity of the light beams from the two light sources 1 and 2 may be adjusted to approximately 2:1 ($\lambda_1:\lambda_2=\lambda_2$ 2:1 or $\lambda_1:\lambda_2=1:2$). Whereby any measurable variations are not caused in frequency under observation.

Accordingly, the optical fiber chromatic dispersion distribution measuring apparatus according to the invention can realize measurement with high measurement sensitivity by using simple configuration.

Since the insertion loss of the optical bandpass filter having the fixed center wavelength is about 5 dB, an improvement is about 5 dB in comparison with an optical bandpass filter having a variable center wavelength, the insertion loss of which is 10 dB.

According to the invention, there is provided an optical fiber chromatic dispersion distribution measuring apparatus for measuring the chromatic dispersion distribution of an optical fiber under test comprising two light sources at least one of which can change wavelength thereof, wherein light beams having different wavelengths from each other and emitted from the two light sources are inputted to the optical fiber under test to measure a four-wave mixing light beam generated by interaction of back scattered light beams of the two light beams by optical time domain reflectometer (OTDR), and wherein an optical bandpass filter having a fixed center wavelength is provided at a previous stage of the optical time domain reflectometer (OTDR). Thus, an optical fiber chromatic dispersion distribution measuring apparatus having high measurement sensitivity and enabling to change interval between wavelengths of the two inputted wavelengths can be obtained with simple configuration.

According to the invention, a coupler for combining the light beams from at least two light sources and an optical amplifier for amplifying the mixed light beam is disposed between the two light sources and the optical fiber under test, and further a directional coupler for outputting the light beams from the two light sources to the optical fiber under test and outputting a light beam from the optical fiber under test to the optical bandpass filter having the fixed center wavelength is disposed at a previous stage of the optical fiber under test. Thus, even if a optical amplifier for compensating a loss due to insertion of the bandpass filter is not used, the optical fiber chromatic dispersion distribution measruing apparatus having well measurement sensitivity can be obtained.

According to the invention, the four-wave mixing light beam measured by the optical time domain reflectometer (OTDR) may be one of light beams generated in lower side and higher side than the wavelengths of the light beams from the two light source, respectively. Thus, setting of the optical bandpass filter is facilitated.

According to the invention, there is provided an optical fiber chromatic dispersion distribution measuring method for measuring the wavelength dispersion in which there is provided two light sources at least one of which can change wavelength thereof; and light beams having different wavelengths from each other and emitted from the two light sources are inputted to the optical fiber under test to measure a four-wave mixing light beam generated by interaction of back scattered light beams of the two light beams by optical time domain reflectometer (OTDR), comprising the steps of adjusting at least one of wavelengths of light beams from the two light sources which can change the wavelengths thereof so that the four-wave mixing light beam becomes the center wavelength of the optical bandpass filter. Thus, even if the wavelengths of the light beams from the two light sources are changed, the optical fiber dispersion can be measured without lowering the measurement sensitivity.

According to the invention, both wavelengths of the light beams from the two light sources which can change the wavelengths thereof is adjusted so that the wavelength of the four-wave mixing light beam becomes the center wavelength of the optical bandpass filter having the fixed center wavelength. Whereby the wavelength of the four-wave mixing light beam is matched to the center wavelength of the optical bandpass filter more freely.

According to the invention, both wavelengths of the light beams from the two light sources which can change the wavelength thereof are changed while holding interval between the wavelengths of the light beams from the two light sources so that the wavelength of the four-wave mixing light beam becomes the center wavelength of the optical bandpass filter having the fixed center wavelength. Whereby adjustment can be done while holding the intensity of the four-wave mixing light beam constant.

According to the invention, ratio of the intensity of the light beams from the two light sources at least one of which can change the wavelength thereof may be adjusted approximately 2:1 (whichever of the values 2 and 1 may be taken by light of the shorter wavelength). Whereby the optical fiber wavelength dispersion can be measured without any measurable variations in frequency under observation

What is claimed is:

1. An optical fiber chromatic dispersion distribution measuring apparatus comprising:

two light sources for outputting light beams having different wavelengths from each other, respectively, to an optical fiber under test;

an optical time domain reflectometer for measuring four-wave mixing light beams generated by an interaction of the light beams inputted to the optical fiber under test; and an optical bandpass filter having a fixed center wavelength, wherein at least one of the two light source is a tunable light source;

the optical bandpass filter is disposed at a previous stage of the optical time domain reflectometer.

2. An optical fiber chromatic dispersion distribution measuring apparatus comprising:

two light sources for outputting CW light beams having different wavelengths from each other, respectively;

an optical coupler for combining a plurality of light beams;

a modulator;

an optical fiber amplifier;

a directional coupler;

an optical fiber under test;

an optical bandpass filter having a fixed center wavelength; and an optical time domain reflectometer;

wherein at least one of the two light source is a tunable light source;

the two light sources output the CW light beams to the optical coupler;

the optical coupler combines the CW light beams and outputs the combined CW light beams to the modulator;

the modulator modulates the CW light beams inputted from the optical coupler to generate pulse light beams having different wavelengths from each other and outputs the pulse light beams to the optical fiber amplifier;

the optical fiber amplifier amplifies the pulse light beams and outputs the amplified pulse light beams to the directional coupler;

the directional coupler outputs the pulse light beams inputted from the optical fiber amplifier to the optical fiber under test and outputs a light beam inputted from the optical fiber under test to the optical bandpass filter;

four-wave mixing light beams are generated in the optical fiber under test due to an interaction of the light beams inputted from the directional coupler and is outputted to the directional coupler;

the optical bandpass filter extracts a light beam within a specific band from the light beam inputted from the directional coupler and outputs the extracted light beam to the optical time domain refelectometer; and the optical time domain reflectometer measures the chromatic dispersion distribution of the extracted light beam.

3. The apparatus according to claim 2, wherein the four-wave mixing light beams are a light beam generated in lower frequency side than the pulse light beams and a light beam generated in higher frequency side than the pulse light beams; and only one of the four-wave mixing light beams is within the specific band of the optical bandpass filter.

4. An optical fiber chromatic dispersion distribution measuring method comprising the steps of:

outputting two light beams having different wavelengths from each other, respectively, to an optical fiber under test;

generating two four-wave mixing light beams in the optical fiber under test;

measuring one of the two four-wave mixing light beams to obtain the chromatic dispersion distribution of the optical fiber under test.

5. An optical fiber chromatic dispersion distribution measurement method comprising the steps of:

outputting two CW light beams having different wavelengths from each other;

combining the CW light beams;

modulating the CW light beams to generate two pulse light beams having the different wavelengths from each other;

amplifying the pulse light beams;

inputting the pulse light beams to an optical fiber under test to generate two four-wave mixing light beams;

extracting one of the four-wave mixing light beams; and measuring the one of the four-wave mixing light beams to obtain the chromatic dispersion distribution of the optical fiber under test.

6. The method according to claim 5, further comprising the steps of adjusting both wavelengths of the two light beams so that wavelength of the one of the four-wave mixing light beams coincides with a center wavelength of an optical bandpass filter having a fixed center wavelength for executing the extracting step.

7. The method according to claim 6, wherein interval between the wavelengths of the two CW light beams is held in the adjusting step.

8. The method according to claim 5, wherein ratio of the intensity of the two CW light beams is approximately 2:1.

* * * * *